April 17, 1951 A. H. FRIESS 2,549,445
GOGGLE SUPPORT
Filed July 27, 1949
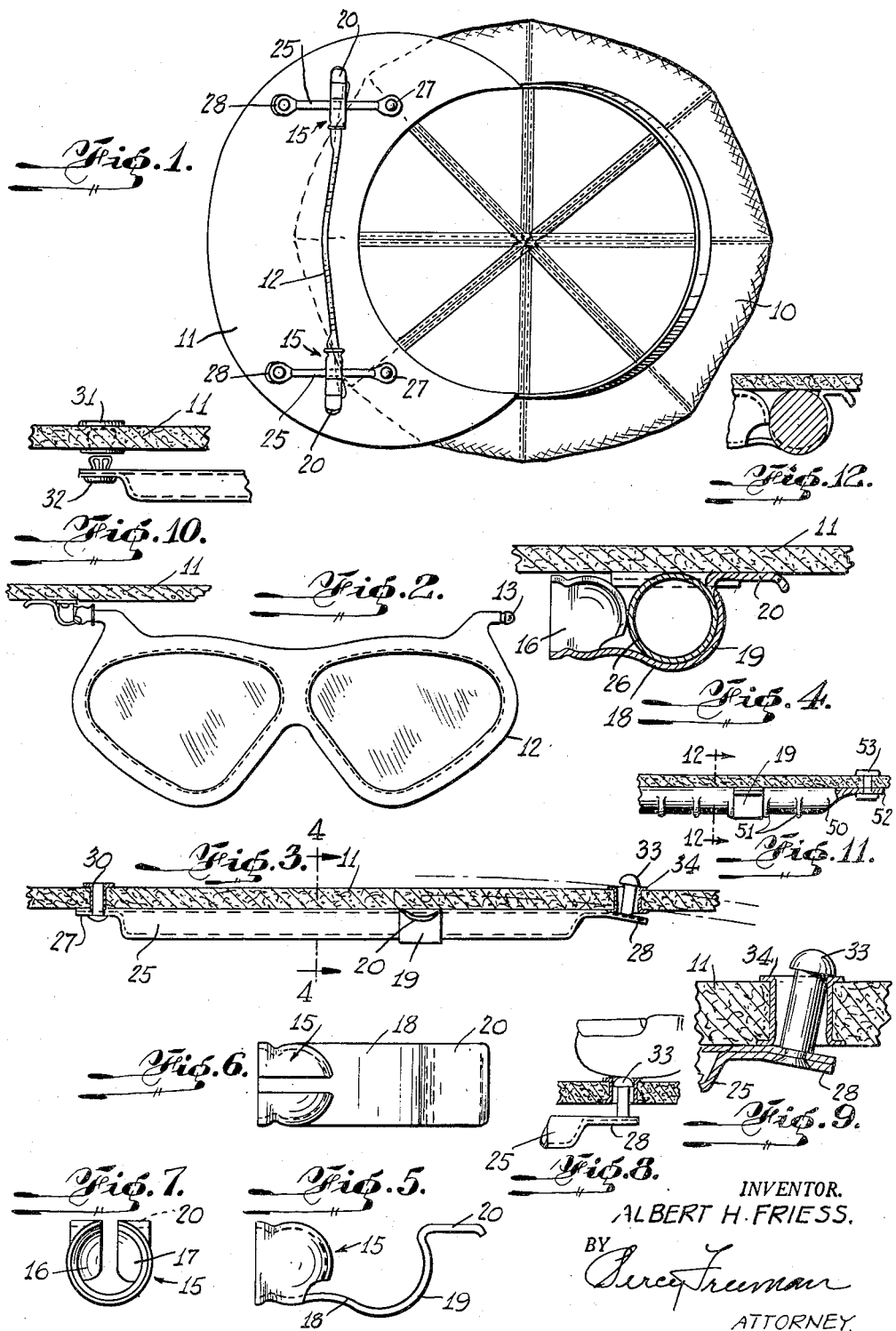
INVENTOR.
ALBERT H. FRIESS.
BY Percy Freeman
ATTORNEY.

UNITED STATES PATENT OFFICE 2,549,445

GOGGLE SUPPORT

Albert H. Friess, New York, N. Y., assignor to Viewmaster Corp., New York, N. Y., a corporation of New York Application July 27, 1949, Serial No. 106,990

2 Claims. (Cl. 2—10)

This invention relates to a goggle support for adjustably supporting a pair of goggles on the visor of a cap or other article of headgear.

The principal object of this invention is the provision of an adjustable support for goggles whereby they may be tilted to operative or inoperative position as and when desired, by simply swinging them to the one or the other position. A ball and socket construction is provided at each end of the pair of goggles and a friction fit is provided between the two sockets and their respective balls. Since each ball and socket construction functions in the manner of a swivel joint, a swinging action is provided which enables the goggles to swing either upwardly to horizontal inoperative position or downwardly to vertical operative position. There are no clamps or other fastening members which require actuation before the goggles may be swung to either position, and there is no locking device to hold the goggles in either of its said positions. There is sufficient freedom between the balls and the sockets of the present construction to enable the goggles to be swung on the goggle support. Nonetheless there is sufficient frictional engagement between said balls and their respective sockets to hold the goggles in any position in which they are placed.

Another object of this invention is the provision of a goggle support of the character described which is simple and inexpensive in construction and which is ideally adapted for mass production manufacturing and assembling purposes.

The balls referred to are spheroidal integral end portions of the goggle frame and are molded therewith by means of the same molding process and same mold by which the frame itself is molded. The socket members may be made of sheet metal and they may be stamped and formed to appropriate size and shape. The socket at one end of the goggle frame is identical with the socket at the opposite end of the frame and hence, only a single die or series of dies is required to make both sockets. Assembly of the two ball and socket constructions is simply a matter of pressing the socket members onto the ball-shaped ends of the frame.

A further object of this invention is the provision of supporting brackets for the adjustable support above described. These supporting brackets are adapted to support the socket members of the ball and socket constructions above mentioned in such manner as to enable said socket members, and hence the goggles which they support, to move longitudinally of said supporting brackets, toward or away from the head of the person wearing the cap on which said supporting brackets and said pair of goggles are mounted. A friction fit is provided between the socket members on the one hand and the supporting brackets and cap visor on the other hand, with means accessible from the upper surface of the cap visor to release the frictional contact when adjustment is desired. These supporting brackets, therefore, contribute a second adjusting feature to the invention forming subject matter of the present application, since they enable the person wearing the goggles to place them either nearer to, or farther away from his eyes, as desired and as required.

A still further object of this invention is the provision of supporting brackets of the character described which are partitioned to provide a plurality of socket member engaging and supporting sections. Ridges or other appropriately raised portions separate the several sections from each other and prevent the socket members from sliding from one section to another. This feature provides positive positioning means for the socket members and renders it possible to position or locate them at any one of a plurality of points or locations on the supporting brackets, without fear that said socket members will become accidentally dislodged or displaced therefrom.

Still another object of this invention is the provision of supporting brackets of the character described which are detachably mountable upon the visor or brim of a cap, helmet or any other suitable kind of headgear.

Preferred forms of this invention are shown in the accompanying drawing, in which:

Fig. 1 is a view of the underside of a cap to whose visor a goggle support made in accordance with present invention is detachably secured.

Fig. 2 is a front view of the goggles shown in Fig. 1, showing a ball-shaped portion at one end thereof and showing the corresponding portion at the opposite end thereof in engagement with a socket member, said socket member being also shown in engagement with one of the supporting brackets.

Fig. 3 is an enlarged fragmentary section through the visor of the cap, showing how one of the supporting brackets is affixed thereto.

Fig. 4 is a greatly detailed sectional view on the line 4—4 of Fig. 3.

Fig. 5 is a front view of one of the socket members.

Fig. 6 is a top view thereof.

Fig. 7 is an end view thereof.

Fig. 8 is a fragmentary view, partly in section, showing how one of the ends of one of the supporting brackets may be detached from the visor of the cap.

Fig. 9 shows the same end of the supporting bracket detachably secured to the visor.

Fig. 10 is another fragmentary sectional view showing another method of detachably securing the supporting bracket to the visor of the cap.

Fig. 11 is a fragmentary view, somewhat similar to that of Fig. 3, showing a partitioned or sectioned supporting bracket on which a socket member is shown to be mounted.

Fig. 12 is a cross-sectional view therethrough on the line 12—12 of Fig. 11.

Cap 10, having visor 11, is representative of the many types of headwear to which goggles, such as the pair of goggles 12 shown in the drawing, may be attached. Visor 11 is made, preferably, of relatively stiff material, so that it will assume and retain a definite shape of substantial rigidity. Pair of goggles 12 may be made of any conventional material and in any conventional shape. In all cases, however, it should be provided with ball-shaped end portions 13, one at each end thereof. If the frame of the pair of goggles should happen to be made of molded plastic material, then the ball-shaped end portions 13 may be made of the same material and in the same mold and by the same process by which the frame proper is made.

A pair of sockets, such as socket 15 shown in Figs. 5, 6, and 7, is provided to embracingly receive ball-shaped end portions 13. Each socket member 15 includes a pair of spherical shells 16 and 17, respectively, which are integral with a bracket 18 which has a curved portion 19 and an angularly disposed portion 20. The concave surfaces of spherical shells 16 and 17 face each other and define a substantially spherical socket between them of sufficient size to accommodate ball-shaped end portion 13. There is sufficient spring tension in the two shell-shaped portions 16 and 17 to enable them to embrace the ball-shaped end portion rather tightly so that an automatic clamping or holding action is provided between said ball-shaped end portion and said shell-shaped portions 16 and 17.

Curved portions 19 of the socket members constitute brackets by which said socket members may be mounted on suitable supporting brackets, such as bracket 25, best shown in Figs. 3 and 4. Two brackets 25 are provided for each pair of goggles as Fig. 1 clearly shows. They may be fixedly attached to the visor of the cap, or they may be completely detachable with respect thereto.

It will be seen in Figs. 3, 4, and 9 that supporting brackets 25 are each made of tubular stock 26, pinched at both ends to form flat end portions 27 and 28 respectively. Tubular material is used for added strength and to save weight, but solid stock may also be used, if desired, in somewhat smaller diameters. Preferably tubular metal is used, but other material, such as plastics may also be used, whether solid or tubular. Rivets 30 may be employed to fasten both ends of supporting bracket 25 to the visor. In such case, the supporting bracket would be permanently attached to the visor. If it be desired, however, to detachably secure the bracket to the visor, snap fastening members 31 and 32, respectively, may be used in place of rivets 30.

Snap fastening member 31 is a female or socket member, and it is firmly attached to the visor. Snap fastening member 32 is of the male variety and it is firmly attached to the bracket. These snap fastening members may be made to engage each other in conventional manner to detachably secure the supporting brackets to the visor. Preferably, a single rivet 30 is used at one end of each supporting bracket 25 and releasable fastening members 33 and 34, respectively, may be used at the opposite end. Member 34 is a hollow rivet and member 33 is a headed pin or rivet. As Fig. 9 clearly shows, end portion 28 of bracket 25 to which headed member 33 is fixedly attached is bent slightly to maintain said headed member at an angle with respect to the longitudinal axis of the tubular member as a whole. Socket member 34, which is fixedly connected to the visor, is adapted to receive the headed member 33. As soon, however, as the head of said headed member projects beyond and clears member 34 on the upper surface of the visor, it engages said member by reason of its angular position, and it enters into locked engagement therewith. To free member 33 from the top of member 34, for the purpose of releasing the friction grip between the end portions 28 and the under surface of the visor, pressure is applied to the head 33 to shift it angularly, that is to say, said member 33 is tilted to perpendicular position relative to supporting bracket 25 as well as relative to the visor, and its head will then be positioned to pass into socket member or hollow rivet 34. The brackets 18 may then be slidably adjusted on supporting brackets 25.

Supporting brackets 25 are mountable upon the underside of the visor in the manner shown in Fig. 1, one at each end thereof, and in parallel relation to each other. Bracket portions 18 of the socket members 15 are mountable upon said supporting brackets 25, as shown, especially in Fig. 4, their respective curved portions 19 in slidable engagement with said supporting brackets, and more especially with the tubular portions 26 thereof. When the socket members are thus mounted on the supporting brackets, their angularly disposed end portions 20 bear upwardly against the visor. This engagement of the angular portions of the socket members with the visor assists in anchoring said socket members and in stabilizing them. When the two socket members are mounted on the two supporting brackets and the pair of goggles is connected by means of its ball-shaped end portions to said socket members, a strongly linked assembly is thereby provided which is securely yet slidably mounted on the supporting brackets. To make doubly certain that the socket members will not disengage the supporting brackets (as when the visor is flexed) the socket portions proper are made to abut the supporting brackets on the side opposite their engagement by the curved portions 19. Hence, the supporting brackets are yieldingly confined between said curved portions 19 and the socket portions proper 15.

It will be apparent from the foregoing that the goggles are adjustable in two respects with regard to the cap on which they are mounted. In the first place, they are swingably adjustable from a vertical to a horizontal plane and back again. In the second place, they are slidably adjustable, forwardly and backwardly, as desired.

A supporting bracket 50 is shown in Figs. 11 and 12, which constitutes a modified version or form of supporting brackets 25 above described. Brackets 25 provide a smooth, continuous and uninterrupted sliding or bearing surface for curved portions 19 of the socket members. Bracket 50, on the other hand, is partitioned into a plurality of spaced sections by means of ridges 51 or other suitable raised or projecting portions or members. The spaces between adjacent ridges correspond to the width of curved portions 19 and said curved portions are, therefore, adapted to engage said bracket 50 in the sections or areas between adjacent ridges. These ridges constitute partitioning means to position curved portions 19 of the socket members and to prevent them from moving from one position on said supporting bracket to another without the active intervention of the wearer.

The supporting bracket shown in Figs. 11 and 12 differs in one other respect from brackets 25 first above described. Each bracket 25 is fastened at one end to the visor by means of a rivet 30 and at its opposite end by means of a headed stud or rivet 33 and a hollow rivet 34, said headed stud being removable from said hollow rivet to swing the supporting bracket relatively free of the visor. Bracket 50, on the other hand, is provided with a flattened portion 52 at both ends and with a permanently affixed rivet 53 affixing each said flattened end to the visor. This construction would correspond to the construction 27, 30 of bracket 25. When it is desired to adjust or change the position of the socket members on brackets 50, curved portions 19 are pulled out of the bracket sections which they engaged and they are then carried over one or more ridges 51 until they are brought into registration and engagement with another, selected section of the bracket.

The foregoing is descriptive of preferred forms of this invention, and it will clearly be understood that other forms and modifications of the preferred forms may be had within the broad scope and spirit of the invention.

Having thus described my invention, what I claim as new and desire to secure by Letters Patent, is:

1. The combination of a cap and a goggle structure, said cap having a visor, cylindrical supporting brackets fixed to the undersurface of the visor at its opposite side edges, said goggle structure including a frame having protruding offset end portions with ball-shaped tips integral therewith and means for interconnecting each protruding end portion and one of said supporting brackets, said means including a one-piece device having a spheroidal spring socket portion at one end frictionally and detachably embracing the adjacent ball-shaped tip, an intermediate curved portion detachably embracing the adjacent bracket and an angular tip portion at the other end adjacent the underside of the visor for manipulating the goggle structure.

2. A goggle support for supporting a pair of goggles on the visor of a cap or other article of headgear, said goggle support comprising a pair of parallel supporting brackets suspended from the underside of the visor, a pair of curved fingers engaging said supporting brackets at selected points thereon, partitions on said supporting brackets separating said selected points from each other and preventing accidental displacement of said curved fingers from any one selected point to any other point on said brackets, whereby said curved fingers may be moved and positioned forwardly and backwardly on the visor, and a pair of ball and socket members connected to said curved fingers and to the pair of goggles for pivotally supporting said pair of goggles on said curved fingers for movement from a vertical plane to a horizontal plane and from a horizontal plane to a vertical plane.

ALBERT H. FRIESS.

REFERENCES CITED

The following references are of record in the file of this patent:

UNITED STATES PATENTS

| Number | Name | Date |
| --- | --- | --- |
| 264,574 | Shone | Sept. 19, 1882 |
| 1,313,469 | Crossley | Aug. 19, 1919 |
| 1,709,765 | Auel | Apr. 16, 1929 |
| 2,004,701 | Livengood | June 11, 1935 |
| 2,475,471 | Brown et al. | July 5, 1949 |

FOREIGN PATENTS

| Number | Country | Date |
| --- | --- | --- |
| 476,306 | France | May 4, 1915 |
| 685,696 | Germany | Dec. 22, 1939 |